UNITED STATES PATENT OFFICE.

DONALD K. TRESSLER, OF PITTSBURGH, PENNSYLVANIA.

MANUFACTURE OF LIQUID GLUE.

1,394,654.      Specification of Letters Patent.      Patented Oct. 25, 1921.

No Drawing.      Application filed December 27, 1920. Serial No. 433,504.

*To all whom it may concern:*

Be it known that I, DONALD K. TRESSLER, a citizen of the United States, residing at Pittsburgh, in the county of Allegheny, State of Pennsylvania, have invented certain new and useful Improvements in the Manufacture of Liquid Glue; and I do hereby declare the following to be a full, clear, and exact description of the invention, such as will enable others skilled in the art to which it appertains to make and use the same.

This invention relates to an improved liquid glue and to improvements in the methods of its production from animal glues.

Ordinary animal glues, such as hide and bone glues, do not dissolve in cold water, but merely swell. They dissolve in hot water to form viscous, colloidal solutions and are ordinarily used as adhesives in this form, *i. e.*, in the form of hot aqueous solutions. When these hot solutions cool much below 100° F., they gelatinize and form tough jellies. Ordinary animal glues, therefore, are not adapted for use with cold water, or when their solutions in hot water are cooled to ordinary temperatures.

It has been known for some time that the presence of relatively large amounts of various substances in glue solutions prevents the formation of tough jellies when the glue solutions are cooled, and it has been proposed to prepare liquid glues by adding such substances to hot glue solutions; but liquid glues so prepared have not, so far as I am aware, proven satisfactory, due to instability, diminution of adhesiveness with age, weakening, on humid days, of glued joints made with such glues, etc. Certain of the substances which it has been proposed to add to glue solutions to prevent the formation of jellies are also prohibitive in price or impart an offensive odor or poisonous properties to the glue or destroy its stability and strong adhesive properties.

As the result of an extended and diligent investigation of the action of a large number of substances on glue solutions, I have found that a novel liquid glue having powerful adhesive properties and free from the objections of the character above mentioned, can be prepared by compounding a thioamido compound, *i. e.*, thiourea, or thiocarbamid, with hot solutions of ordinary hide or bone glue. I have found that viscous glue solutions containing thiourea do not gelatinize when cooled to ordinary temperatures and are not hygroscopic, and that such solutions possess valuable properties.

Among the properties and advantages characteristic of the new liquid glue of the present invention may be mentioned the following:—It will remain at ordinary temperatures for an indefinite period if kept in a tightly closed container at ordinary room temperatures; it is not hygroscopic; it has powerful adhesive properties and retains such properties for long periods of time; joints made with it retain substantially their full strength in humid weather; it adheres firmly to glass, wood, metal, etc.; it can be dried and ground and the resulting dried glue dissolved in water at ordinary temperatures, in which it is completely soluble; it is elastic and does not crack undesirably when dry; it is light in color; and it forms jellies only at low temperatures.

The new liquid glue can be made from ordinary hide or bone glue by various methods of procedure. The invention will be further illustrated by the following specific examples of different methods of producing the new liquid glue.

As a preferred method of production, I make a solution of thiourea in hot water, containing about 25% of thiourea. I then add finely ground bone or hide glue while the hot solution is stirred, adding about one half part of high grade hide glue for each part of solution, or about one part of bone glue for each part of solution, continuing the stirring until all of the glue is in solution. I then add a suitable preservative or preservatives to prevent the liquid glue from spoiling. For example, I may add about one part of phenol or cresol per one hundred parts of liquid glue to prevent bacterial action; and, to prevent the growth of mold on the surface of the glue, approximately one part of artificial oil of camphor or an equal amount of some other essential oil, dissolved in an equal volume of denatured alcohol for each one thousand parts of liquid glue.

As an alternative method of production, I may dissolve the hide or bone glue in the amount of water mentioned above, and then add about fifteen parts of the thiourea, with constant stirring, and then add the preservatives and intimately incorporate them with the liquid glue.

Instead of making the liquid glue from previously prepared hard glue, I may make it directly from the hide or bone stock, with but slight changes in the customary procedure used in the manufacture of hard glue.

The glue liquor may be prepared by the extraction of the hide or bone stock in the usual way, and then evaporated until the liquor contains about 40% hide glue or 50% bone glue, and then about fifteen parts of thiourea added for each one hundred parts of the glue liquor, finally adding the preservative or preservatives.

The resulting liquid glue produced as above described has the desirable properties above mentioned, and is valuable for use where a liquid glue possessing these properties is desired.

It will accordingly be seen that the new liquid glue forms a valuable adhesive and possesses properties which makes it of particular value for use in the household or for other purposes.

I claim:

1. A glue composition comprising glue compounded with thiourea.

2. A liquid glue, comprising a solution of animal glue and thiourea.

3. A glue composition containing from fifteen to twenty-five parts of thiourea to about forty to one hundred parts of glue.

In testimony whereof I affix my signature.

DONALD K. TRESSLER.